United States Patent [19]
Lee

[11] Patent Number: 6,017,056
[45] Date of Patent: Jan. 25, 2000

[54] VENTING DEVICE OF AIR BAG SYSTEM

[75] Inventor: Ju-Young Lee, Kyungki-do, Rep. of Korea

[73] Assignee: Hyundai Motor Company, Seoul, Rep. of Korea

[21] Appl. No.: 08/984,051

[22] Filed: Dec. 3, 1997

[30] Foreign Application Priority Data

Dec. 19, 1996 [KR] Rep. of Korea ..................... 96-67748

[51] Int. Cl.[7] .................................................. B60R 21/28
[52] U.S. Cl. ............................................. 280/739; 280/735
[58] Field of Search .................................... 280/739, 738, 280/736, 742, 731, 735

[56] References Cited

U.S. PATENT DOCUMENTS 5,184,845   2/1993   Omura ..................................... 280/739
5,709,405   1/1998   Saderholm et al. ..................... 280/739
5,743,558   4/1998   Seymour ................................. 280/739

*Primary Examiner*—Paul N. Dickson
*Attorney, Agent, or Firm*—Birch, Stewart, Kolasch & Birch, LLP

[57] ABSTRACT

An air bag system having an air bag, an impact sensor, and a calculator, including vent holes formed at a joint of the air bag and an inflator to communicate with the air bag; and vent hole opening control means for regulating the opening of the respective vent holes. The vent hole opening control means has a rotor with a plurality of slots formed along a circumference to overlap the vent holes, and a gear extending to the outside; a stepping motor engaging with the gear of the rotor to drive the rotor by stages; bearings provided to the inflator coupling disc to support the free rotation of the rotor; and a compression ring for making the bearings contact the rotor.

10 Claims, 4 Drawing Sheets

VENTING DEVICE OF AIR BAG SYSTEM

BACKGROUND OF THE INVENTION

(1). Field of the Invention

The present invention generally relates to an air bag system which is installed in an automotive vehicle to provide protection for a driver or passengers against the impact of a collision. More particularly, it relates to a venting device of an air bag system which has vent holes, opened and closed variably according to the velocity of collision to provide the best possible air bag performance, and prevents a gas leakage of the air bag at an initial stage to enhance the effect of earlier restraint.

(2). Description of the Prior Art

An air bag system serves as an auxiliary device of a seat belt in order to protect a driver or passengers with safety in case of sudden collision. The air bag system consists of an air bag module having an air bag, an inflator, a gas generator, and a pat cover, and a front impact sensor, a rotary contact switch, an alarm lamp, and a calculator. Thus, if the automotive vehicle collides with another automotive vehicles during running at a specified speed, a safety switch and the front impact sensor are turned on, and simultaneously with triggering the inflator, the air bag is rapidly inflated with gas, generated from this inflator, and is deflated after it runs into a driver's face or a passenger's to provide cushioned protection for him or her.

The air bag is a round-shaped bag made of rubber-coated nylon, and its capacity is 50 to 60 R. The air bag is installed on the inflator, being folded, and is rapidly inflated with nitric gas produced from the inflator.

The conventional air bag system will be more fully described referring to FIG. 1.

The conventional air bag system includes an air bag 50 with vent holes 60, an inflator 51 having gas outlets 51a to instantaneously ignite a gas generator charged in it and generate nitric gas, thus inflating the air bag with the nitric gas, an inner panel 52 integrally formed with the inflator 51 and an outer panel 54 inserted between the inner panel 52 and coupling panel 53 and coupled therewith by fixing means.

In case of sudden collision, the nitric gas, produced from the inflator 51, flows into the interior of the air bag 50 through the gas outlets 51a, and inflates the air bag 50 rapidly, thus early restraining the driver or passengers. As the air bag 50 runs into him or her, it absorbs the shock and the gas inside of the air bag is continuously discharged to the outside through the vent holes 60 so that the air bag 50 is deflated.

In order that the air bag provides more efficient protection for the driver or passengers against the impact of a collision, the air bag must be unfolded very quickly to restrain a driver or a passenger earlier and have a long distance of variation with a given pressure once the driver or passengers is restrained. The vent holes serve to discharge the inner gas in order that the air bag, providing cushioned protection for the driver or passengers, has a long distance of variation. However, the conventional vent holes are formed at the bottom of the air bag, and when the air bag is inflated, the gas is discharged to the outside through the vent holes, which decreases a speed at which the air bag is inflated with gas, thus obstructing the earlier restraint of the driver or passengers. Thus, it is preferable that the vent holes are closed at the time when the air bag is unfolded, and are opened to a certain degree in proportion to the pressure increase so as to properly absorb the impact created when the air bag runs into his or her face after it has been unfolded.

As described above, the conventional vent holes 60 are formed in the air bag 50 to a specific size, and the nitric gas, flowing into the air bag 50 in case of collision, is discharged to the outside through these vent holes 60, thus making the air bag 50 be slowly inflated with the gas and interfering with earlier restraint of a driver or a passenger. The gas is discharged to the outside through the vent holes that are opened to a certain extent regardless of the velocity of collision, which deteriorates the passenger safety.

SUMMARY OF THE INVENTION

The present invention is a venting device of an air bag which can obviate the disadvantages of the conventional technique.

It is an objective of the present invention to provide a venting device of an air bag, of which vent holes are closed to prevent a gas leakage while the air bag is being unfolded in case of sudden collision, and are opened to a proper extent according to the velocity of collision as a predetermined period of time elapses after collision, thus assuring an earlier restraint of a driver or a passenger and safetying him or her more efficiently.

In order to obtain the above-mentioned objective of the present invention, there is disclosed an air bag system with an air bag, an impact sensor, and a calculator, including vent holes formed at a joint of the air bag and an inflator to communicate with the air bag; and vent hole opening control means for regulating the opening of the respective vent holes. The vent holes are formed along its circumference at each of an inner panel provided to the inside of the air bag, a coupling part of the air bag, an outer panel connected with an air bag door, and an inflator coupling disc.

The vent hole opening control means includes a rotor having a plurality of slots formed along a circumference to overlap the vent holes, and a gear extending to the outside; and a stepping motor engaging with the gear of the rotor to drive the rotor by stages.

The vent hole opening control means further includes bearings provided to the inflator coupling disc to support the free rotation of the rotor; and a compression ring for making the bearings contact the rotor.

BRIEF DESCRIPTION OF THE ATTACHED DRAWINGS

Figure 6A:
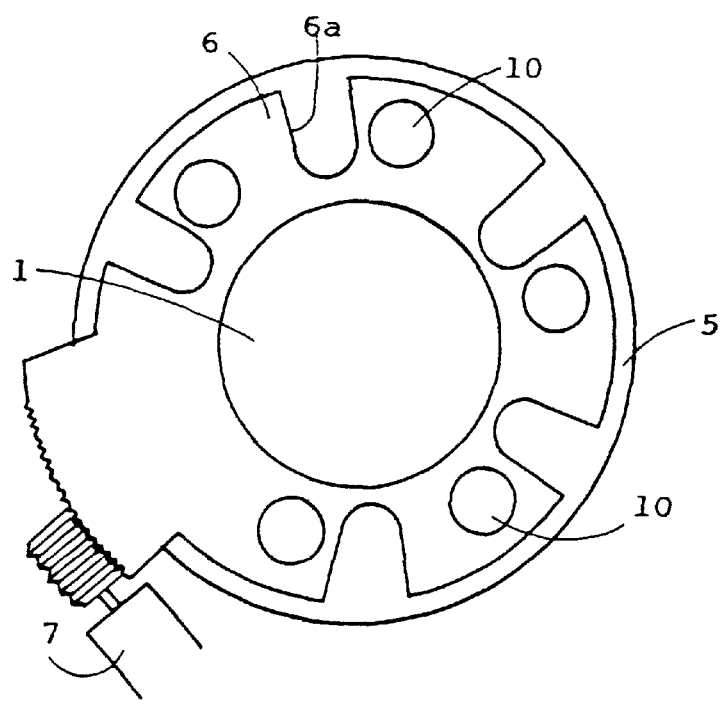
Figure 6B:
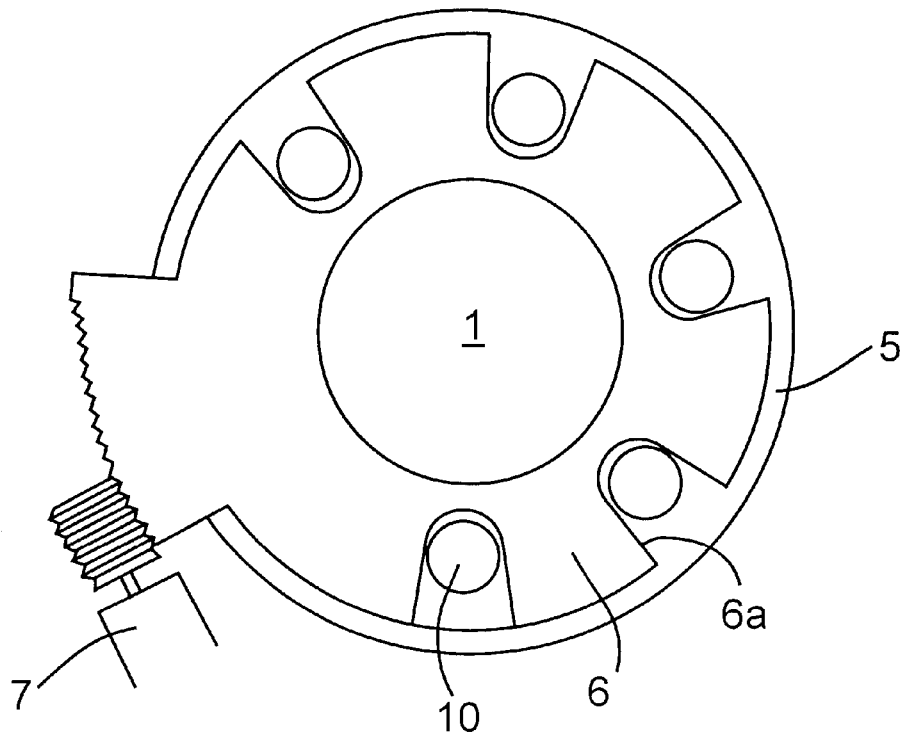
Figure 7A:
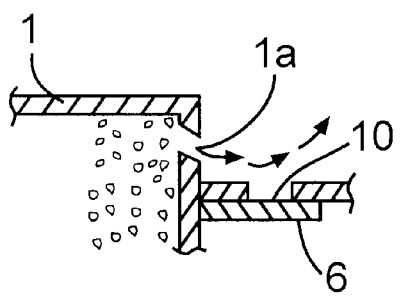
Figure 7B:
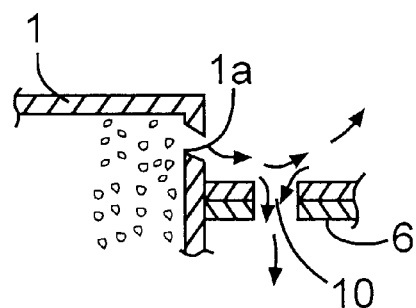

FIGS. 6A and 6B each depict the operating state of a rotor and an inflator coupling disc; and FIGS. 7A and 7B are each sectional views showing a gas leakage according to the opening/closing of vent holes of the air bag system in accordance with the present invention.

DETAILED DESCRIPTION OF PREFERRED EMBODIMENTS

Preferred embodiments of the present invention will be described in detail with reference to the accompanying drawings.

Figure 1:
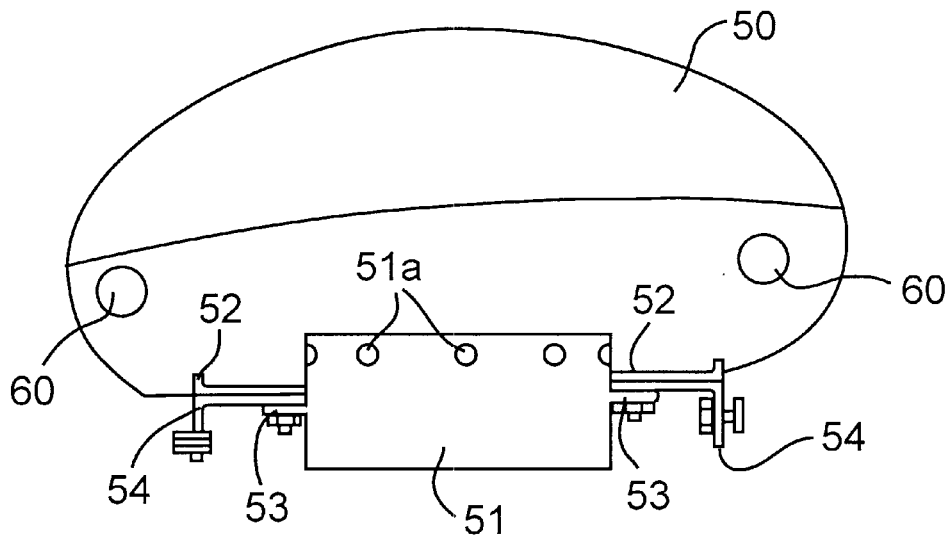
FIG. 1 is a sectional view of an air bag system in accordance with a conventional art.
Figure 2:
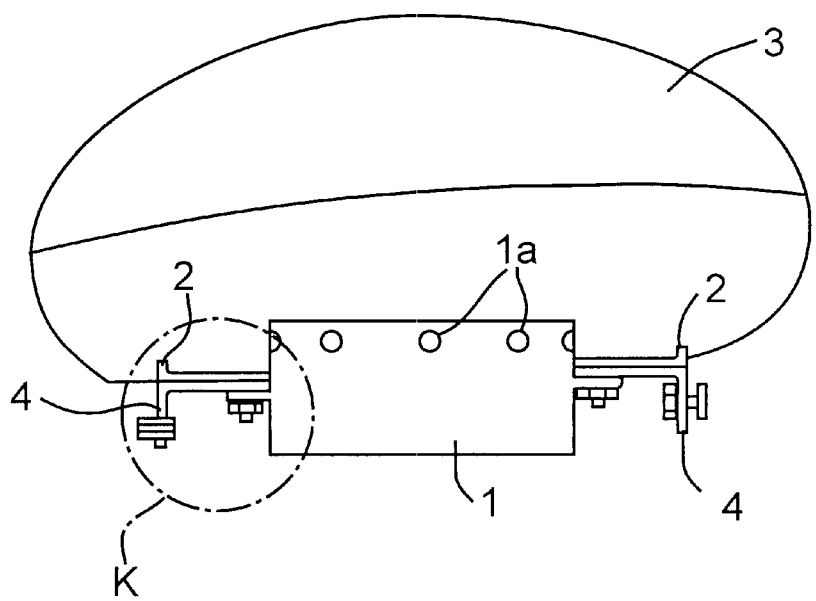
FIG. 2 is a sectional view of an air bag system in accordance with the present invention.
Figure 3:
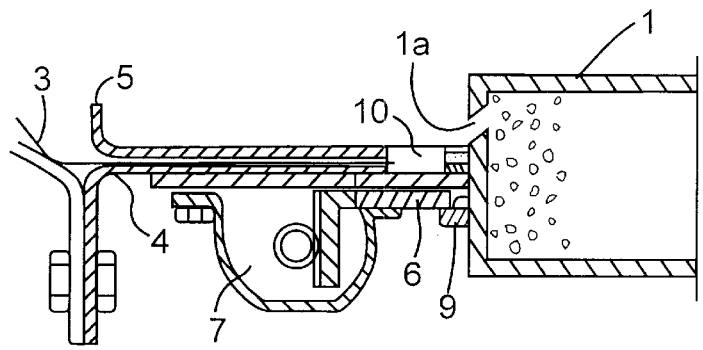
FIG. 3 is an enlarged view of K of FIG. 2.
Figure 4:
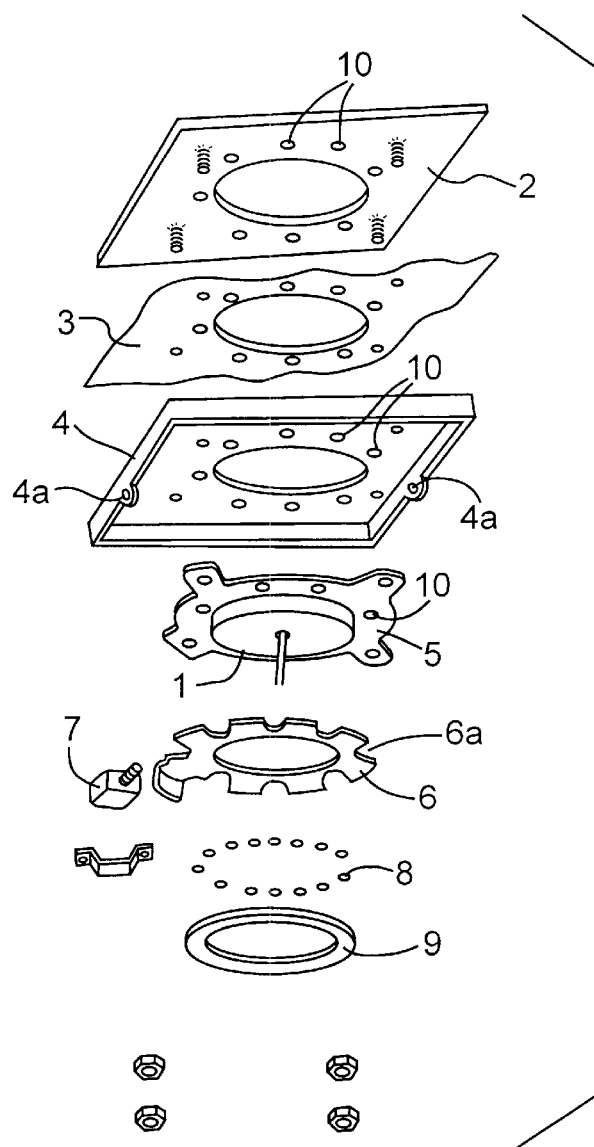
FIG. 4 is an exploded-perspective view of a venting device of the inventive air bag system.

FIG. 2 is a sectional view of an air bag system in accordance with the present invention, and FIG. 3 is an enlarged view of K of FIG. 2. FIG. 4 is an exploded-perspective view of a venting device of the air bag system.

As shown in FIG. 2, no vent hole is formed at the bottom of an air bag 3. Vent holes 10 of the air bag 3 are formed on a joint of an inflator 1 and the air bag 3, which is depicted in FIG. 3. FIG. 3 shows the position of the vent holes 10 in accordance with the present invention. The vent holes 10 may be made at any position where vent hole opening control means (will be described later) can be installed.

As shown in FIG. 4, to join the inflator 1 with the air bag 3, there are provided an inner panel 2, an outer panel 4 having coupling holes 4a to be connected with an air bag door (not shown), and an inflator coupling disc 5 installed under the outer panel 4 to be connected to the inner panel 2, the air bag 3, and the outer panel 4 by means of bolts. Under the inflator coupling disc 5 are provided a rotor 6, bearings 8 and a compression ring 9.

In the venting device of the inventive air bag, a plurality of the vent holes 10 are made at each of the inner panel 2, the air bag 3, the outer panel 4, the inflator coupling disc 5, corresponding to each other. The vent holes 10, through which the gas inside the air bag 3 is discharged to the outside, are adjacent to gas outlets 1a of the inflator 1.

The vent hole opening control means of the present invention includes a rotor 6 installed coming in close contact with the bottom of the inflator coupling disc 5 and having a plurality of slots 6a formed along the outer circumference and a gear 6b protruding to the outside, a stepping motor 7 driving the rotor 6 at a predetermined angle of rotation by stages, the bearings 8 and the compression ring 9 placed under the inflator coupling disc 5 and supporting the free rotation of the rotor 6.

Figure 5:
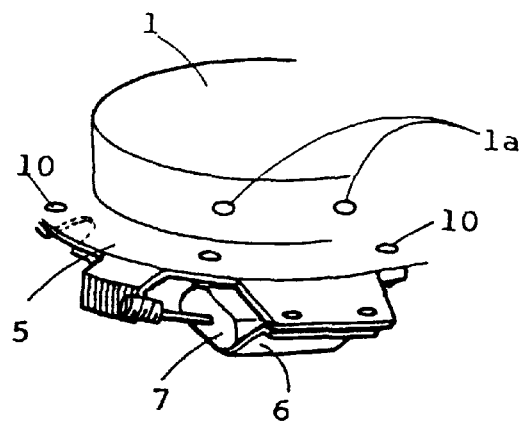
FIG. 5 is a partial-perspective view of the venting device of the air bag system into which various components are assembled.

As shown in FIGS. 5 and 6, the slots 6a are formed to overlap the vent holes 10 of the inflator coupling disc 5, and as the rotor 6 turns by the stepping motor 7, the vent holes 10 are opened by stages from the closing to the complete opening. FIG. 6A shows the vent holes 10 being closed, and FIG. 6B depicts the vent holes 10 being completely opened.

In case that an automotive vehicle runs into another car or collides with it from behind, once a collision velocity sensor detects the velocity of collision, an electronic control unit (ECU) determines an angle of rotation of the stepping motor 7 in response to the velocity of collision, and generates a corresponding signal to the stepping motor 7.

The stepping motor 7 goes into action, for example, when 50 msec elapses after collision, at the time when the air bag 3 is fully inflated with the gas, so the rotor 6 turns by a predetermined angle of rotation by the gear 6b. At this point, as the vent holes 10 are closed by the slots 6a to a certain extent or are opened completely, the gas inside the air bag 3 is discharged to the outside through the vent holes 10 opened to a different degree according to the velocity of collision detected during collision.

The size of the respective vent holes 10 through which the gas is discharged to the outside, depends on the angle of rotation of the stepping motor 7, and is determined by algorithm or control map of the calculator or ECU.

As shown in FIG. 7, since the vent holes 10 are being closed, the gas from the inflator 1 is furnished to the air bag 3 only in a manner that the air bag 3 is more rapidly inflated. As a predetermined period of time elapses, the vent holes 10 are opened so the gas flowing in via the gas outlet 1a of the inflator 1 and the gas inside the air bag 3 are discharged to the outside through the vent holes 10 at the same time.

Accordingly, when a driver or a passenger is restrained by the air bag 3 and his or her upper body moves forward after collision, the air bag is constricted with a predetermined pressure kept, thereby maximizing the shock absorbing effect.

As described above, the vent holes and the vent hole opening control means are formed at the joint of the inflator and air bag. These vent holes are closed at first, and in case of collision, the air bag is rapidly inflated with gas to provide an earlier restraint of a driver or a passenger. The opening degree of the vent holes varies with the angle of rotation of the rotor that is determined by the velocity of collision, and the shock absorbing effect of the air bag 3 is enhanced by its vent holes 10 opened to a certain degree corresponding to the velocity of collision the moment his or her upper body moves forward.

What is claimed is:

1. An air bag system comprising: an air bag, an inflator, an impact sensor, a calculator, vent holes formed at a joint of the air bag and the inflator to communicate with the air bag, the vent holes being formed in a peripheral array; and vent hole opening control means for regulating the opening of the respective vent holes, wherein the vent holes are formed along a circumference at each of (a) an inner panel provided to an inside of the air bag, (b) a coupling part of the air bag, (c) an outer panel connected with an air bag door, and (d) an inflator coupling disc.

2. The air bag system according to claim 1, wherein the vent hole opening control means comprises:

a rotor having a plurality of slots formed along a circumference of the rotor to overlap the vent holes; a gear formed on the rotor extending outside the circumference of the rotor; and a stepping motor engaging with the gear of the rotor to drive the rotor by stages.

3. The air bag system according to claim 2, wherein the vent hole opening control means further comprises:

bearings contacted to the inflator coupling disc to support the free rotation of the rotor; and a compression ring for making the bearings contact the rotor.

4. An air bag system comprising:

an air bag having an inside and an outside;

an inflator;

an impact sensor;

a calculator;

an inner panel contacting the inside of the air bag;

an outer panel contacting the outside of the air bag; vent holes formed in the inner panel and the outer panel at a joint of the air bag and the inflator to communicate with the air bag, the vent holes being formed in a circular array along a circumference of the inner panel and the outer panel; and vent hole opening control means for regulating the opening of the respective vent holes;

wherein the vent holes consecutively formed along the circumference of the inner panel, a coupling part of the air bag, the outer panel and an inflator coupling disc, are all aligned so that the holes are open;

wherein the vent hole opening control means comprises a rotor having a plurality of slots formed along a circumference to overlap the vent holes, a gear formed on the rotor extending outside the circumference of the rotor, and a stepping motor engaging with the gear of the rotor to drive the rotor by stages;

wherein the vent hole opening control means further comprises bearings contacted to the inflator coupling disc to support the free rotation of the rotor, and a compression ring for making the bearings contact the rotor.

5. A method for protecting passengers against the impact of a collision, which comprises:

providing an automotive vehicle equipped with the air bag system of claim 4 with the vent holes closed by the rotor, a collision velocity sensor, and an electronic control unit (ECU);

detecting a collision of the automotive vehicle with the collision velocity sensor;

inflating the air bag;

calculating a predetermined angle of rotation of the stepping motor based upon collision velocity, said calculation being performed by the ECU;

allowing a time interval after the collision to elapse; and activating the stepping motor to turn the rotor through the predetermined angle of rotation.

6. The method of claim 5, wherein the time interval is 50 msec.

7. A gas venting system comprising:

a gas container;

an inflator;

vent holes formed at a joint of the gas container and the inflator to communicate with the gas container, the vent holes being formed in a peripheral array; and vent hole opening control means for regulating the opening of the respective vent holes, wherein the vent holes are formed along a circumference at each of (a) an inner panel provided to an inside of the gas container, (b) a coupling part of the gas container, (c) an outer panel connected with a gas container door, and (d) an inflator coupling disc.

8. The gas venting system according to claim 7, wherein the vent hole opening control means comprises:

a rotor having a plurality of slots formed along a circumference to overlap the vent holes;

a gear formed on the rotor extending outside the circumference of the rotor; and a stepping motor engaging with the gear of the rotor so as to drive the rotor by stages.

9. The gas venting system according to claim 8, wherein the vent hole opening control means further comprises:

bearings contacted to the inflator coupling disc to support the free rotation of the rotor; and a compression ring for making the bearings contact the rotor.

10. The gas venting system according to claim 7 wherein the gas container is a bag.

* * * * *